March 2, 1954  J. F. KRAUSE  2,671,206
ADJUSTABLE TRANSDUCER
Filed Dec. 29, 1950  2 Sheets-Sheet 1
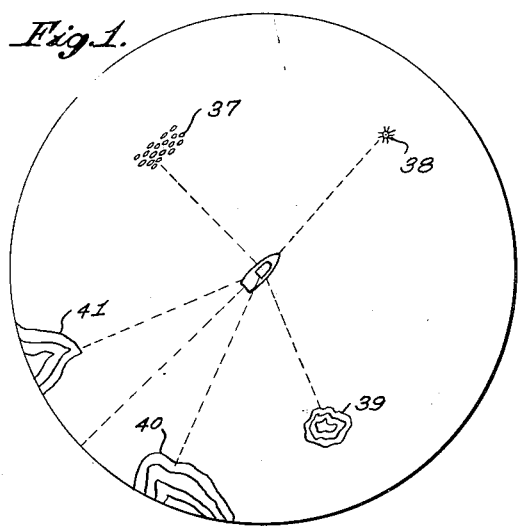
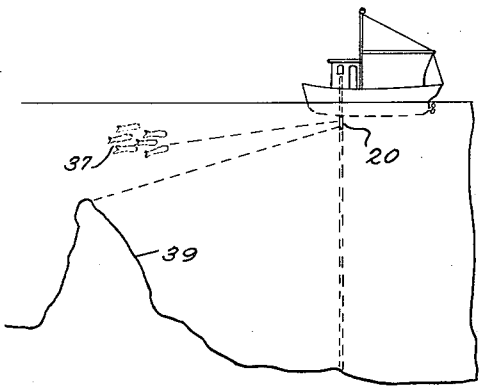
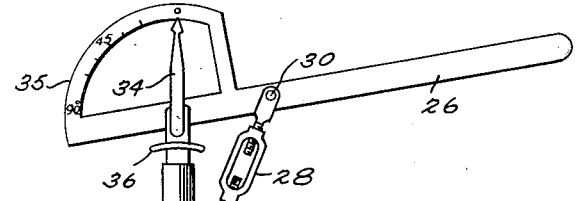
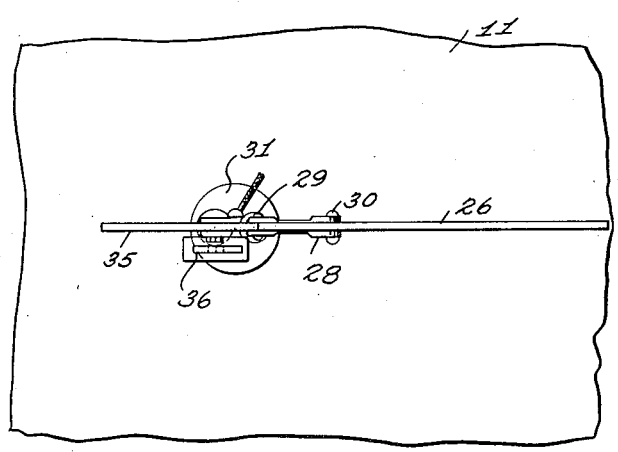
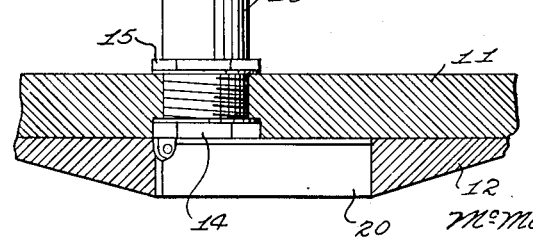
INVENTOR.
JOSEPH F. KRAUSE
BY
McMorrow, Berman & Davidson
ATTORNEYS March 2, 1954 — J. F. KRAUSE — 2,671,206
ADJUSTABLE TRANSDUCER
Filed Dec. 29, 1950 — 2 Sheets-Sheet 2

INVENTOR.
JOSEPH F. KRAUSE
BY
McMorrow, Berman & Davidson
ATTORNEYS

Patented Mar. 2, 1954

2,671,206

UNITED STATES PATENT OFFICE 2,671,206

ADJUSTABLE TRANSDUCER

Joseph F. Krause, Ketchikan, Territory of Alaska

Application December 29, 1950, Serial No. 203,519

2 Claims. (Cl. 340—5)

This invention relates to under-water, sound-detecting and indicating apparatus, and more particularly to an adjustable sound-transmitting and receiving device for use in marine detection apparatus.

A main object of the invention is to provide a novel and improved adjustable tranducer assembly for use in marine detection apparatus of the "Fathometer" type, wherein means is provided for lowering the transducer element and rotating said transducer element so that indications may be received of obstructions or other objects located at a distance from the vessel carrying the device, as well as depth indications.

A further object of the invention is to provide an improved adjustable mechanism for orienting the transducer of a marine detection system in any desired direction, the mechanism being simple in construction, involving relatively few parts, being easy to operate, and providing accurate indications of the degree of angular adjustment of the transducer element.

Further objects and advantages of the invention will become apparent from the following description and claims, and from the accompanying drawings, wherein:

Figure 1 is a diagrammatic top view showing a vessel located at various distances from different objects and illustrating a typical condition wherein detection of the objects may be obtained by the apparatus of the present invention;

Figure 2 is a diagram illustrating the position of a vessel with relation to under-water objects and illustrating the arrangement wherein the apparatus of the present invention may be employed for determining and indicating the presence of the various objects, as well as the depth of water below the vessel;

Figure 3 is an elevational view of an apparatus according to the present invention showing the transducer element arranged for obtaining depth indications;

Figure 4 is a top plan view of the apparatus of Figure 3;

Figure 5:
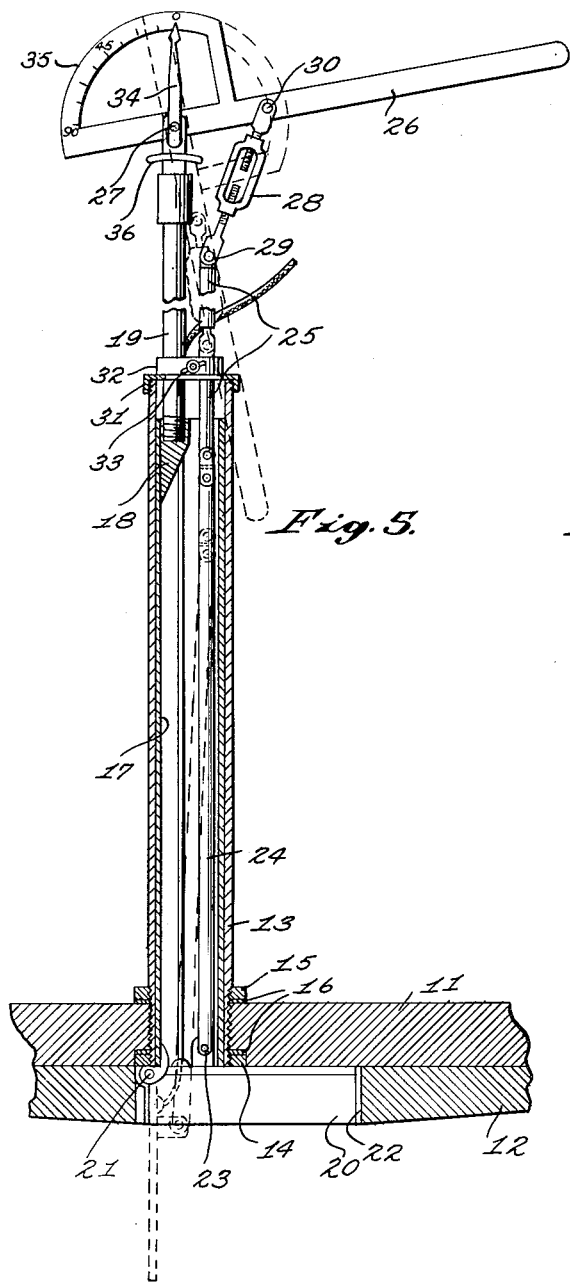
Figure 5 is a vertical cross-sectional view taken through the apparatus of Figure 3.

Referring to the drawings, and more particularly to Figures 3 to 6, 11 designates the hull of a vessel, and 12 designates the keel thereof. Designated at 13 is a vertical, upstanding, cylindrical, tubular member whose lower end is secured to the hull of the vessel, said tubular member being threaded at its lower end and being locked in vertical position relative to the portion of the hull 11 shown in Figures 3, 5 and 6 by respective lock nuts 14 and 15 engaged on the member 13 above and below the hull 11. Suitable sealing gaskets 16 are provided between the nuts 14 and 15 and hull 11 to provide a watertight connection of tubular member 13 to the hull. Designated at 17 is an inner tubular member which is slidably and rotatably mounted inside the member 13, the member 17 having rigidly secured in its top portion a boss 18 into which is threaded the vertical, upstanding post member 19. Designated at 20 is a conventional transducer element which is hinged at 21 to the lower end of the inner tubular member 17 and which is receivable in a recess 22 formed in the keel 12, whereby the transducer element 20 may be arranged in a horizontal position for making depth soundings.

Pivotally connected to the transducer element 20 at 23 is the lower end of a link rod 24 which extends upwardly through the inner tubular member 17 and which may include one or more detachable segments 25 connected to its top end. Designated at 26 is a lever which is pivotally connected at 27 to the top end of the post member 19. Designated at 28 is an adjustable link member pivotally connected at its lower end to the uppermost link rod segment 25, as shown at 29, and pivotally connected at its top end to the intermediate portion of the lever 26, as shown at 30. Threaded on the top end of the outer tubular member 13 is a cap 31 which is provided with an upstanding clamping sleeve 32 through which extends the post member 19 and the link members 25, the clamping collar 32 being provided with a suitable wing nut 33 engaging a bolt passing through the collar and arranged so that the post element 19 and the link member 25 may be releasably clamped in side-by-side relation. Rigidly secured to the top end of the post element 19 is the upstanding, vertical points 34, and rigidly carried on the lever 26 is the arcuate, upstanding scale 35 extending adjacent the pointer 34, as shown in Figures 3 and 5, the scale 35 being calibrated to indicate the angular position of the lever 26. Mounted on the upper portion of the post member 19 subjacent the pointer 34 is a bubble level 36 which may be suitably calibrated to indicate the inclination with respect to vertical of the post member 19. The scale 35 is suitably calibrated to indicate the angular position of the transducer member 20, the angular position of said transducer element being determined by the angular position of the lever 26 in view of the link connection between the transducer element 20 and lever 26 provided by the link elements 24, 25 and 28.

Figure 6:
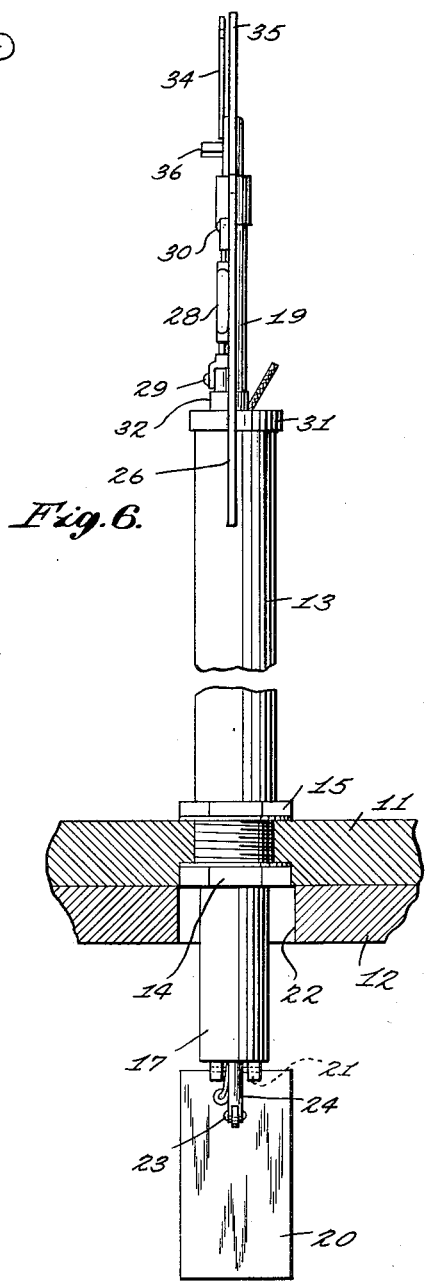
Figure 6 is an elevational view of the apparatus of Figure 3, but taken in a direction 90° rotated from the direction of the view of Figure 3, and showing the transducer element lowered to a position below the keel of the vessel on which the apparatus is mounted, with the transducer element arranged to provide indications of objects rotated at a distance from the vessel.

When the wing nut 33 is loosened, the inner sleeve 17 may be moved vertically, for example, may be lowered from the position of Figure 6, moving the transducer element 20 to a position below the kneel 12, and the sleeve 17 may be locked in this position by tightening the wing nut 33. When the parts are in the position shown in Figure 3, the apparatus is suitable for obtaining the usual depth indications, since the transducer element 20 is disposed in a horizontal position in the keel 12. When it is desired to obtain indications of objects located at distances from the vessel, for example, objects such as schools of fish 37, mines 38, shoals 39, or shore line points, such as 40 and 41 in Figure 1, the sleeve 17 is lowered to the position shown in Figure 6, and the transducer element 20 is lowered by rotating the lever 26 clockwise, as viewed in Figure 5. As above explained, the post element 19 and the link member 25 may be locked by tightening the wing nut 33. When the transducer 20 has been lowered to the position of Figure 6 and locked in depending position by tightening wing nut 33, the sleeve member 17 and transducer 20 may be rotated around the axis of the sleeve member 17 by rotating the cap 31. This enables the transducer 20 to be employed as a searching device and to pick up indications from various objects located around the vessel at distances therefrom, for example, the objects 37 to 41 shown in Figure 1. Since the transducer element 20 is part of a conventional depth-sounding apparatus, the range distance of various objects from which indications are obtained may be observed directly from the indicator of the apparatus. Since the angular position of the transducer element 20 may be readily determined from the position of scale 35 with respect to pointer 34 when any particular indication is received, the angular position of the object giving the indication may be readily determined. Suitable correction for listing of the vessel may be applied by observing the reading of the bubble level 36.

The adjustable link 28 enables the lever 26 to be set at a zero reading of pointer 34 relative to scale 35 when the transducer element 20 is disposed in its normal, depth-finding position, shown in Figure 5.

The link elements 25 are employed for extending the link rod 24 to a desired length in accordance with the requirements of a particular installation. Said link elements 25 are, of course, rigidly connected to the main link rod 24.

The transducer 20 may form part of a conventional "Fathometer," such as Fathometer Model 1080B, manufactured by Submarine Signal Division, Raytheon Mfg. Co., Waltham, Massachusetts.

While a specific embodiment of an improved adjustable transducer assembly for a marine detection apparatus has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a marine detection apparatus, a first tubular member adapted to be secured to a vessel in an upstanding position with the lower end of said tubular member opening below the hull bottom of the vessel, a second tubular member rotatably and slidably mounted in said first tubular member, cooperating releasable locking means on said tubular members arranged to support the second tubular member in vertically adjusted position relative to the first tubular member, a transducer hinged to the lower end of said second tubular member, a link rod pivotally connected to said transducer and extending upwardly through said second tubular member, whereby the transducer may be rotated around its hinge axis by moving said link rod through the second tubular member and whereby said transducer may be rotated around the axis of the tubular members by rotating the second tubular member in the first tubular member, said locking means including an upstanding post element fixedly secured to the top end of said second tubular member and a clamping collar rotatably mounted on the first tubular member and engaging said post element, a lever pivoted to said post element for rotation about an axis perpendicular to the axis of said post element, an angle scale secured to said lever adjacent said post element, and link means connecting said lever to the top end of said link rod, said locking means being arranged to clampingly engage said link means, said scale being arranged adjacent said post element to indicate the degree of angular rotation of the transducer around its hinge axis.

2. In a marine detection apparatus, a first tubular member adapted to be secured to a vessel in an upstanding position with the lower end of said tubular member opening below the hull bottom of the vessel, a second tubular member rotatably and slidably mounted in said first tubular member, cooperating releasable locking means on said tubular members arranged to support the second tubular member in vertically adjusted position relative to the first tubular member, a transducer hinged to the lower end of said second tubular member, a link rod pivotally connected to said transducer and extending upwardly through said second tubular member, whereby the transducer may be rotated around its hinge axis by moving said link rod through the second tubular member and whereby said transducer may be rotated around the axis of the tubular members by rotating the second tubular member in the first tubular member, said locking means including an upstanding post element fixedly secured to the top end of said second tubular member and a clamping collar engaging said post element and rotatably mounted on the first tubular member, a lever pivoted to the said post element for rotation about an axis at right angles to the axis of said post element, an angle scale secured to said lever adjacent said post element, link means connecting said lever to the top end of said link rod, said locking means being arranged to clampingly engage said link means, said scale being arranged adjacent said post element to indicate the degree of angular rotation of the transducer around its hinge axis, and a bubble level mounted on said post element adjacent said lever, whereby the relative inclination of the post member to the vertical may be indicated simultaneously with the indication of the degree of angular rotation of the transducer around its hinge axis.

JOSEPH F. KRAUSE.

References Cited in the file of this patent

UNITED STATES PATENTS

| Number | Name | Date |
| --- | --- | --- |
| 2,396,722 | Russell | Mar. 19, 1946 |
| 2,426,657 | Williams | Sept. 2, 1947 |
| 2,452,068 | Peterson | Oct. 26, 1948 |

FOREIGN PATENTS

| Number | Country | Date |
| --- | --- | --- |
| 489,671 | Great Britain | Aug. 2, 1938 |